United States Patent
Kantareddy et al.

(10) Patent No.: US 9,141,460 B2
(45) Date of Patent: Sep. 22, 2015

(54) IDENTIFY FAILED COMPONENTS DURING DATA COLLECTION

(71) Applicant: International Business Machines Corporation, Armonk, NY (US)

(72) Inventors: Harini Kantareddy, Hyderabad (IN); Ravirajan Rajan, Apex, NC (US); Arun Ramakrishnan, Tamil Nadu (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 13/799,493

(22) Filed: Mar. 13, 2013

(65) Prior Publication Data

US 2014/0281755 A1  Sep. 18, 2014

(51) Int. Cl.
  *G06F 11/30* (2006.01)
  *G06F 11/07* (2006.01)
  *G06Q 10/00* (2012.01)
  *H04L 12/24* (2006.01)

(52) U.S. Cl.
  CPC ........ *G06F 11/0766* (2013.01); *G06F 11/0709* (2013.01); *G06F 11/0754* (2013.01); *G06Q 10/00* (2013.01); *H04L 41/046* (2013.01); *H04L 41/0695* (2013.01); *H04L 41/142* (2013.01); *H04L 41/069* (2013.01)

(58) Field of Classification Search
  CPC .. G06F 11/008; G06F 11/076; G06F 2201/81
  USPC ....................................................... 714/47.2
  See application file for complete search history.

(56) References Cited

U.S. PATENT DOCUMENTS

| 7,003,560 | B1 | 2/2006 | Mullen et al. |
| 7,505,886 | B1 * | 3/2009 | Alvarez et al. ................. 703/14 |
| 7,739,547 | B2 | 6/2010 | Chen et al. |
| 7,756,827 | B1 | 7/2010 | Yung et al. |
| 7,941,397 | B2 | 5/2011 | Wilms et al. |
| 8,103,685 | B1 | 1/2012 | Farizon et al. |
| 8,112,399 | B2 | 2/2012 | Buros et al. |
| 8,214,329 | B2 | 7/2012 | Gilder et al. |
| 8,479,057 | B2 * | 7/2013 | Poletto et al. ................. 714/47.3 |
| 2003/0065986 | A1 * | 4/2003 | Fraenkel et al. ................ 714/47 |
| 2003/0158697 | A1 * | 8/2003 | Gold et al. .................... 702/132 |

(Continued)

OTHER PUBLICATIONS

"Standard Deviation", Aug. 5, 2011, Wikipedia, http://en.wikipedia.org/wiki/Standard_deviation.*

(Continued)

*Primary Examiner* — Chae Ko
(74) *Attorney, Agent, or Firm* — Francis Lammes; Stephen J. Walder, Jr.; Thomas E. Tyson

(57) ABSTRACT

A mechanism is provided for identifying failed components during data collection. For each data source combination in a plurality of data sources, a determination is made as to whether a standard deviation ($\sigma$) for an estimated collection interval of the data source is above a predetermined standard deviation threshold ($\sigma_{th}$). Responsive to the standard deviation ($\sigma$) for the estimated collection interval of the data source being above the predetermined standard deviation threshold ($\sigma_{th}$), an error signal is generated indicating an error in data collection with the data source.

17 Claims, 3 Drawing Sheets

(56) References Cited

U.S. PATENT DOCUMENTS

| | | | |
|---|---|---|---|
| 2005/0228880 A1* | 10/2005 | Champlin | 709/224 |
| 2005/0240376 A1* | 10/2005 | Uwatoko et al. | 702/183 |
| 2005/0262394 A1* | 11/2005 | Yasukawa et al. | 714/23 |
| 2007/0113692 A1* | 5/2007 | Yasukawa et al. | 73/865.9 |
| 2008/0300888 A1* | 12/2008 | Dell'Anno et al. | 705/1 |
| 2010/0011254 A1* | 1/2010 | Votta et al. | 714/47 |
| 2010/0083055 A1* | 4/2010 | Ozonat | 714/47 |
| 2012/0042214 A1* | 2/2012 | Jacobs et al. | 714/47.2 |
| 2012/0290262 A1* | 11/2012 | Md Sani | 702/181 |
| 2013/0031424 A1* | 1/2013 | Srivastava et al. | 714/47.2 |
| 2014/0145849 A1* | 5/2014 | Huang et al. | 340/584 |

OTHER PUBLICATIONS

"Keepalive", http://en.wikipedia.org/wiki/Keepalive, retrieved Dec. 5, 2012, 2 pages.

Kutare, Mahendra et al., "Monalytics: Online Monitoring and Analytics for Managing Large Scale Data Centers", Proceedings of the 7th International Conference on Autonomic Computing (ICAC'10), Washington, DC, Jun. 7-11, 2010, pp. 141-150.

Narayanan, Krishnaprasad et al., "Towards 'Integrated' Monitoring and Management of Data-Centers using Complex Event Processing Techniques", Compute'11, Bangalore, India, Mar. 25-26, 2011, 5 pages.

Smarsly, Kay et al., "A Multi-Agent-Based Collaborative Framework for a Self-Managing Structural Health Monitoring System", http://eil.stanford.edu/publications/kay_smarsly/smarsly2011d.pdf, ASCE Journal of Computing in Civil Engineering, 26(1), 2012, 38 pages.

Wendt, Jerome M., "New Intelligent Monitoring Framework in Storage Foundation HA 5.1 SP1 Introduces Proactive Detection of Failed Processes for Faster Recoveries", http://www.symantec.com/connect/node/1583331, retrieved Dec. 5, 2012, 3 pages.

* cited by examiner

IDENTIFY FAILED COMPONENTS DURING DATA COLLECTION

BACKGROUND

The present application relates generally to an improved data processing apparatus and method and more specifically to mechanisms for identifying failed components during data collection.

Analytics is the discovery and communication of meaningful patterns in data. Especially valuable in areas rich with recorded information, analytics relies on the simultaneous application of statistics, computer programming, and operations research to quantify performance. Analytics often favors data visualization to communicate insight.

Firms may commonly apply analytics to business data, to describe, predict, and improve business performance. Specifically, arenas within analytics include enterprise decision management, retail analytics, store assortment and Stock Keeping Unit (SKU) optimization, marketing optimization and marketing mix analytics, web analytics, sales force sizing and optimization, price and promotion modeling, predictive science, credit risk analysis, and fraud analytics. Since analytics can require extensive computation, the algorithms and software used for analytics harness the most current methods in computer science, statistics, and mathematics.

SUMMARY

In one illustrative embodiment, a method, in a data processing system, is provided for identifying failed components during data collection. The illustrative embodiment determines whether a standard deviation ($\sigma$) for an estimated collection interval of a data source is above a predetermined standard deviation threshold ($\sigma_{th}$) for each data source combination in a plurality of data sources. The illustrative embodiment generates an error signal indicating an error in data collection with the data source in response to the standard deviation ($\sigma$) for the estimated collection interval of the data source being above the predetermined standard deviation threshold ($\sigma_{th}$).

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Being able to perform analytics and provide the consumer with game changing recommendations relies on availability/collection of data. Availability of data depends on availability of data sources, instrumentation or agents, and connectivity between components. Issues with data sources include instances where the data source may go down leading to no data being collected from that data source. Issues with instrumentation or agents or even the system running the agent may go down leading to data not being collected. Finally, issues with connectivity between components include connectivity between the data source and agent for the data source or the agent for the data source and the data warehouse might go down leading to loss of data. Thus, having all these components working correctly ensures accurate analytics and, in turn, accurate reports. In large environments, such as clouds, data centers, or the like, when one of these components fails, the failure may go unnoticed and is detected only after the data from that data source has shown a significant amount of deviation from normal.

Thus, the illustrative embodiments provide a monitoring solution to identify failed components during data collection. More specifically, the illustrative embodiments monitor the data warehouse to ensure that the different agents that are writing to the data store are writing at a regular frequency. By analyzing the data store and using patterns to identify anomalies in the data, the illustrative embodiments detect any agent that has not reported back. This approach rests on the premise that analytics revolves around the data that is collected and ensuring that the data being collected is complete and continuous, thus allowing the illustrative embodiments to identify any issues that might occur with the data or the data sources.

Figure 1:
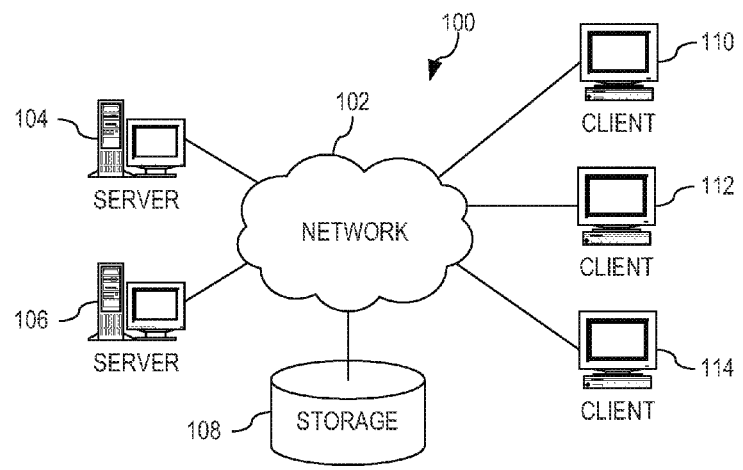
FIG. 1 is an example diagram of a distributed data processing system in which aspects of the illustrative embodiments may be implemented.
Figure 2:
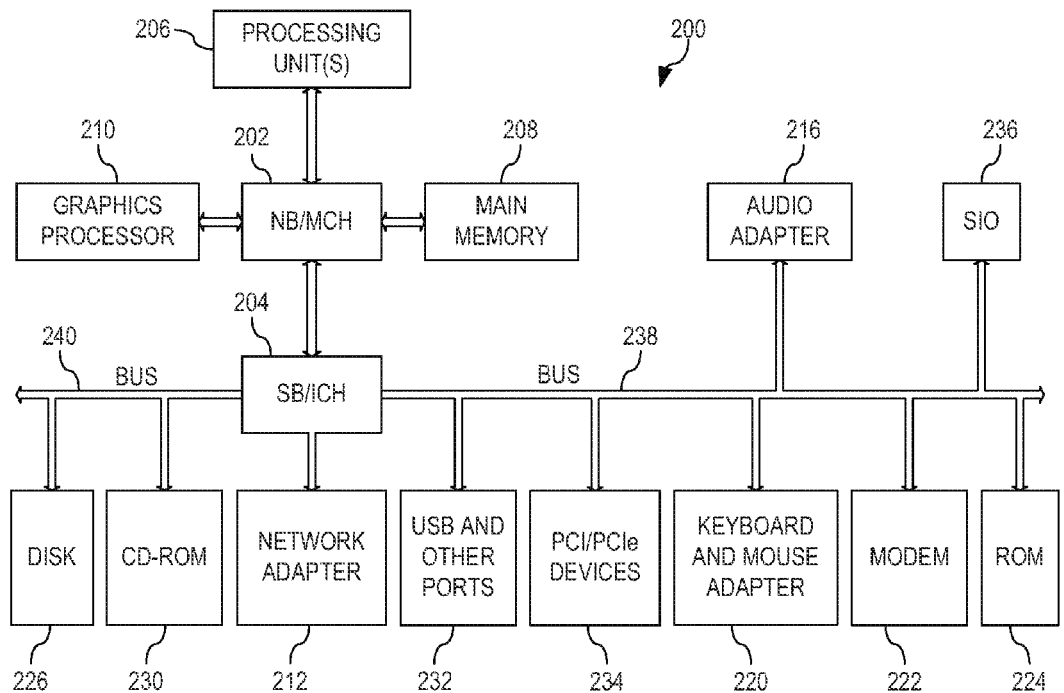
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments. FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
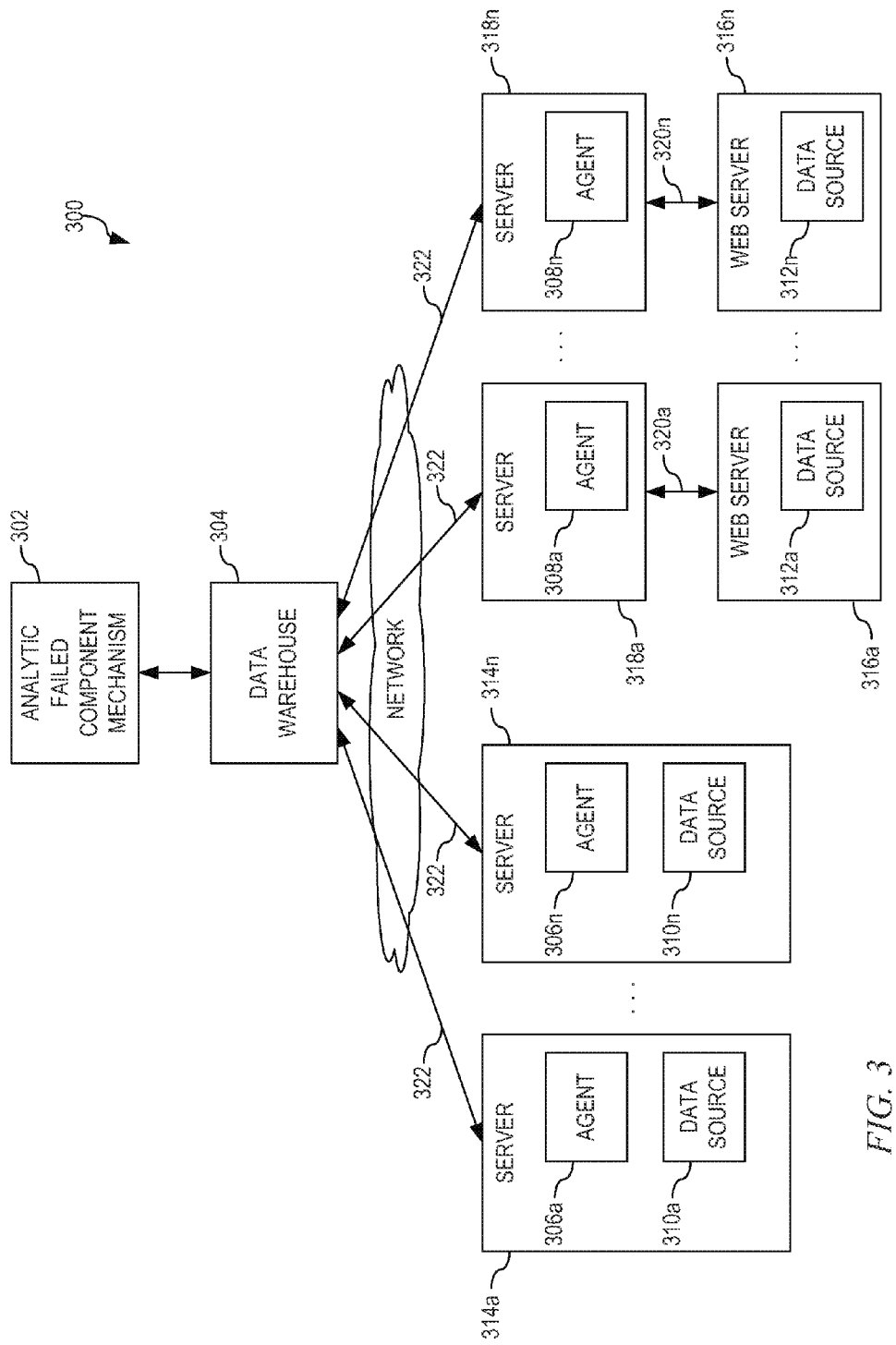
FIG. 3 depicts an analytic failed component mechanism for identifying failed components during data collection in accordance with an illustrative embodiment.

Again, the illustrative embodiments provide a monitoring solution to identify failed components during data collection. Thus, FIG. 3 depicts an analytic failed component mechanism for identifying failed components during data collection in accordance with an illustrative embodiment. Data processing system 300 comprises analytic failed component mechanism 302 which is coupled to data warehouse 304, which is a database used for reporting and data analysis. While analytic failed component mechanism 302 is exemplified as being a component exterior to data warehouse 304, the illustrative embodiment recognize that analytic failed component mechanism 302 may be also comprised within data warehouse 304.

Data warehouse 304 is then coupled to data sources 310a-310n and 312a-312n via network couplings 322 and their respective agents 306a-306n and 308a-308n. As is illustrated, the data source and agent may reside within a single server such as server 314a or 314n or the data source may reside in a separate server, such as Web server 316a or 316n, while the agent resides within server 318a or 318n. Thus, agents 308a and 308n have external couplings 320a and 320n to data sources 312a and 312n, respectively. Each of agents 306a-306n and 308a-308n collect data from data sources 310a-310n and 312a-312n at specified collection intervals and store the data in data warehouse 304.

In order to ensure an availability of data, analytic failed component mechanism 302 identifies failed components, such as agents, data sources, or connectivity issues, during data collection. Initially, analytic failed component mechanism 302 queries data warehouse 304 to retrieve that latest n records for agents 306a-306n and 308a-308n reporting on their respective data sources 310a-310n and 312a-312n at specific time intervals. Each record comprises data source identifier, agent identifier, last updated time value, or the like. Analytic failed component mechanism 302 denotes an identifier with each of the records such that the most recent record's last updated time value is $s_1$, the next most recent record's last updated time value is $s_2$, and so on. Thus, the time values associated with each record are identified as $s_1$, $s_2$, $s_3$, etc., which are historical times and go chronologically backwards.

By noting a current start time value (c), a first updated time value upon associated with a most recent record from an agent ($s_1$), a second updated time value upon retrieving a next most recent record from the same agent ($s_2$), and so on, analytic failed component mechanism 302 determines an estimated collection interval ($\mu$) for each agent/data source. That is, analytic failed component mechanism 302 identifies n collection intervals (x) by subtracting the previous time value from a current time value as follows:

Current time value=$c$

Updated time intervals=$\{s_1,s_2,s_3,\ldots,s_n\}$

Collection intervals=$\{x_1=(c-s_1), x_2=(s_1-s_2),\ldots, x_n=(s_{(n-1)}-s_n)\}$ Then, in order to estimate the collection interval, analytic failed component mechanism 302 adds the collections intervals together and then divides by the number of intervals as follows:

Estimated collection interval ($\mu$)=$(x_1+x_2+\ldots+x_n)/n$

Once the estimated collection interval for each agent/data source is determined, analytic failed component mechanism 302 determines a standard deviation ($\sigma$) for the estimated collection interval as follows:

Standard deviation ($\sigma$)=$\sqrt{[((x_1-\mu)^2+(x_2-\mu)^2+\ldots+(x_n-\mu)^2)/n]}$ While the estimated collection interval and standard deviation are illustrated as encompassing all of the collection intervals, the illustrative embodiments recognized that some subset of collection intervals may be utilized so that, for example, only the most recent collection intervals are used, such as the last 50, 100, etc.

With the standard deviation ($\sigma$) determined, analytic failed component mechanism 302 determines whether the standard deviation ($\sigma$) is above some predetermined standard deviation threshold ($\sigma_{th}$). A low standard deviation indicates that the last collection time tends to be very close to the average time between collections, whereas high standard deviation indicates that the last collection time is spread out over a large range of the average time between collections. If the determined standard deviation fails to be above the predetermined standard deviation threshold, then analytic failed component mechanism 302 repeats the above process. However, if the determined standard deviation is above the predetermined standard deviation threshold, analytic failed component mechanism 302 generates an error signal to indicate that something is wrong with the data collection for the agent/data source. Upon receiving the error signal, one or more corrective actions may be implemented so as to pinpoint the actual component that is in error and to correct the error.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
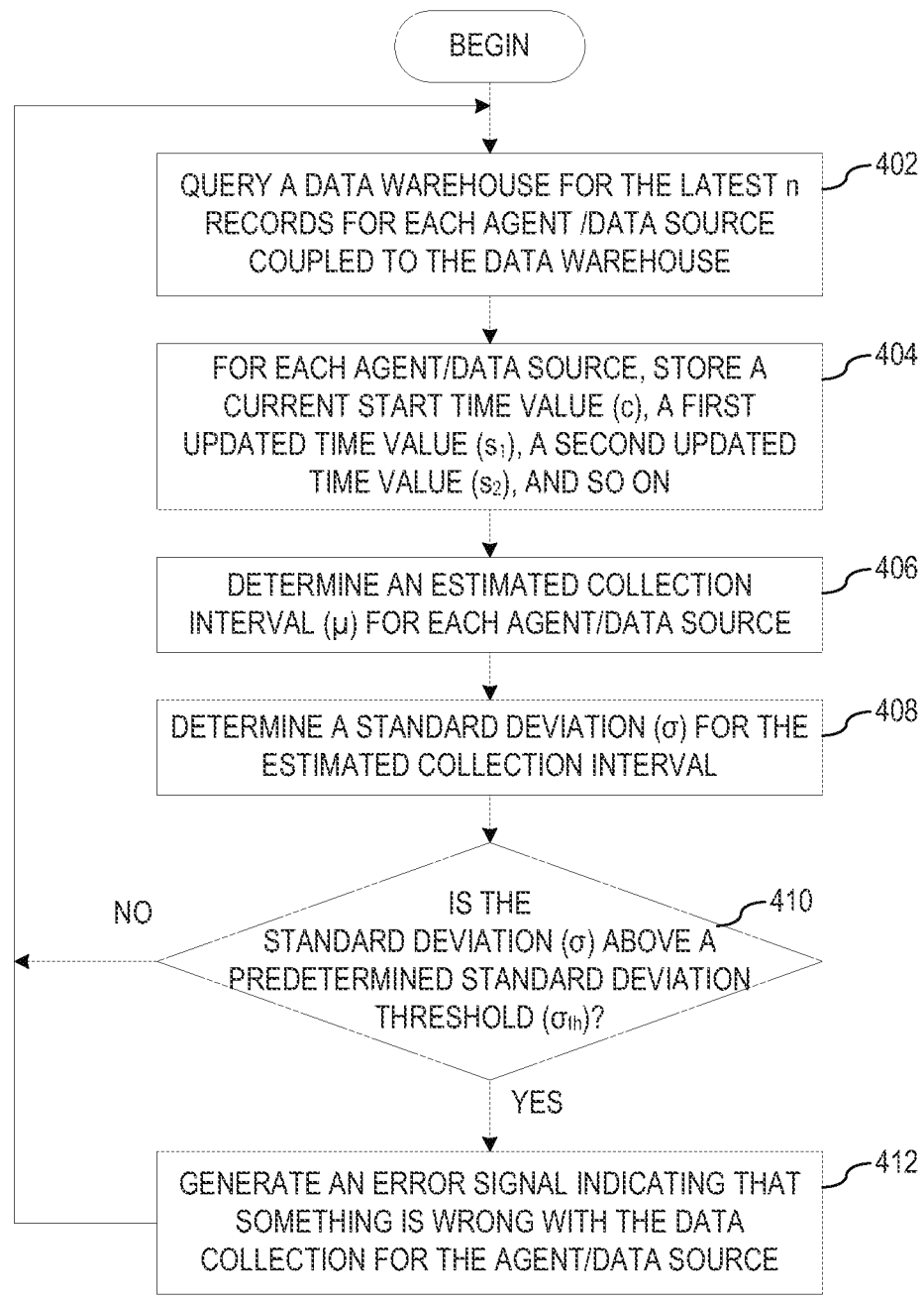
FIG. 4 depicts an exemplary functional block diagram of the operation performed by an analytic failed component mechanism in accordance with an illustrative embodiment.

FIG. 4 depicts an exemplary functional block diagram of the operation performed by an analytic failed component mechanism in accordance with an illustrative embodiment. As the operation begins, the analytic failed component mechanism queries a data warehouse for the latest n records for each agent/data source coupled to the data warehouse (step 402). For each agent/data source, the analytic failed component mechanism stores a current start time value (c), an initial updated time value upon retrieving an initial record from an agent ($s_1$), a second updated time value upon retrieving a subsequent record from the same agent ($s_2$), and so on (step 404). Upon collecting an adequate number of records for the agent/data source for accurate analysis, the analytic failed component mechanism determines an estimated collection interval ($\mu$) for each agent/data source (step 406) as follows:

$$\text{Estimated collection interval } (\mu) = (x_1 + x_2 + \ldots + x_n)/n$$

where the collection intervals are determined as:

$$\text{Collection intervals} = \{x_1 = (c - s_1), x_2 = (s_1 - s_2), \ldots, x_n = (s_{(n-1)} - s_n)\}, \text{ and}$$

where c is the current time interval and $\{s_1, s_2, s_3, \ldots, s_n\}$ are the updated time intervals.

Then, once the estimated collection interval for the agent/data source is determined, the analytic failed component mechanism determines a standard deviation ($\sigma$) for the estimated collection interval (step 408) as follows:

$$\text{Standard deviation } (\sigma) = \sqrt{[((x_1 - \mu)^2 + (x_2 - \mu)^2 + \ldots + (x_n - \mu)^2)/n]}$$

With the standard deviation ($\sigma$) determined, the analytic failed component mechanism determines whether the standard deviation ($\sigma$) is above some predetermined standard deviation threshold ($\sigma_{th}$) (step 410). A low standard deviation indicates that the last collection time tends to be very close to the average time between collections, whereas high standard deviation indicates that the last collection time is spread out over a large range of the average time between collections. If at step 410 the determined standard deviation fails to be above the predetermined standard deviation threshold, then the operation returns to step 402. If at step 410 the determined standard deviation is above the predetermined standard deviation threshold, then the analytic failed component mechanism generates an error signal indicating that something is wrong with the data collection for the agent/data source (step 412), with the operation returning to step 402 thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a monitoring solution to identify failed components during data collection. The analytic failed component mechanism monitors a data warehouse to ensure that the different agents that are writing to the data store are writing at a regular frequency. By analyzing the data store and using patterns to identify anomalies in the data, the analytic failed component mechanism detects any agent that has not reported back. This approach rests on the premise that analytics revolves around the data that is collected and ensuring that the data being collected is complete and continuous, thus allowing the analytic failed component mechanism to identify any issues that might occur with the data or the data sources.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for identifying failed components during data collection, the method comprising:
   for each data source in a plurality of data sources coupled to a data warehouse:
      retrieving a set of records pertaining to the data source, wherein each record in the set of records comprises a data source identifier and a last updated time value;
      determining a set of collection intervals for the data source, wherein, for each record, a collection interval in the set of collection intervals is determined by identifying a difference between a last updated time value associated with the record and a last updated time value associated with an immediately preceding record;
      utilizing the set of collection intervals for the data source, determining an estimated collection interval of the data source;
      utilizing the estimated collection interval, determining a standard deviation for the estimated collection interval;
      determining whether the standard deviation ($\sigma$) for the estimated collection interval of the data source is above a predetermined standard deviation threshold ($\sigma_{th}$); and
      responsive to the standard deviation ($\sigma$) for the estimated collection interval of the data source being above the predetermined standard deviation threshold ($\sigma_{th}$), generating an error signal indicating an error in data collection with the data source.

2. The method of claim 1, wherein the standard deviation ($\sigma$) for the estimated collection interval is determined utilizing the following formula:

$$\text{standard deviation } (\sigma) = \sqrt{[((x_1-\mu)^2 + (x_2-\mu)^2 + \ldots + (x_n-\mu)^2)/n]}$$

and wherein $x_1, x_2, \ldots, x_n$ are the set of collection intervals, wherein $\mu$ is the estimated collection interval, and wherein n is the number of collection intervals.

3. The method of claim 2, wherein the estimated collection interval is determined utilizing the following formula:

$$\text{estimated collection interval } (\mu) = (x_1 + x_2 + \ldots + x_n)/n$$

and wherein $x_1, x_2, \ldots, x_n$ are the set of collection intervals and wherein n is the number of collection intervals.

4. The method of claim 1, wherein a low standard deviation indicates that a last collection time tends to be very close to an average time between collections and wherein a high standard deviation indicates that the last collection time is spread out over a large range of the average time between collections.

5. The method of claim 1, wherein the error in data collection with the data source is at least one of an error in the data source, an error in an agent serving the data source, an error in a data connection to the agent, or an error in a data connection between the agent and the data source.

6. The method of claim 1, wherein the standard deviation is for all collection intervals.

7. The method of claim 1, wherein the standard deviation is for a subset of all collection intervals.

8. A computer program product comprising a computer readable storage medium having a computer readable program stored therein, wherein the computer readable program, when executed on a computing device, causes the computing device to:
   for each data source in a plurality of data sources coupled to a data warehouse:
      retrieve a set of records pertaining to the data source, wherein each record in the set of records comprises a data source identifier and a last updated time value;
      determine a set of collection intervals for the data source, wherein, for each record, a collection interval in the set of collection intervals is determined by identifying a difference between a last updated time value associated with the record and a last undated time value associated with an immediately preceding record;
      utilizing the set of collection intervals for the data source, determine an estimated collection interval of the data source;
      utilizing the estimated collection interval, determine a standard deviation for the estimated collection interval;
      determine whether the standard deviation ($\sigma$) for the estimated collection interval of the data source is above a predetermined standard deviation threshold ($\sigma_{th}$); and
      responsive to the standard deviation ($\sigma$) for the estimated collection interval of the data source being above the predetermined standard deviation threshold ($\sigma_{th}$), generate an error signal indicating an error in data collection with the data source.

9. The computer program product of claim 8, wherein the standard deviation ($\sigma$) for the estimated collection interval is determined utilizing the following formula:

$$\text{standard deviation } (\sigma) = \sqrt{[((x_1-\mu)^2 + (x_2-\mu)^2 + \ldots + (x_n-\mu)^2)/n]}$$

and wherein $x_1, x_2, \ldots, x_n$ are the set of collection intervals, wherein $\mu$ is the estimated collection interval, and wherein n is the number of collection intervals.

10. The computer program product of claim 9, wherein the estimated collection interval is determined utilizing the following formula:

$$\text{estimated collection interval } (\mu) = (x_1 + x_2 + \ldots + x_n)/n$$

and wherein $x_1, x_2, \ldots, x_n$ the set of collection intervals and wherein n is the number of collection intervals.

11. The computer program product of claim 8, wherein a low standard deviation indicates that a last collection time tends to be very close to an average time between collections and wherein a high standard deviation indicates that the last collection time is spread out over a large range of the average time between collections.

12. The computer program product of claim 8, wherein the error in data collection with the data source is at least one of an error in the data source, an error in an agent serving the data source, an error in a data connection to the agent, or an error in a data connection between the agent and the data source.

13. An apparatus, comprising:
a processor; and
a memory coupled to the processor, wherein the memory comprises instructions which, when executed by the processor, cause the processor to:
for each data source in a plurality of data sources coupled to a data warehouse:
retrieve a set of records pertaining to the data source wherein each record in the set of records comprises a data source identifier and a last updated time value;
determine a set of collection intervals for the data source, wherein, for each record, a collection interval in the set of collection intervals is determined by identifying a difference between a last updated time value associated with the record and a last updated time value associated with an immediately preceding record;
utilizing the set of collection intervals for the data source, determine an estimated collection interval of the data source;
utilizing the estimated collection interval, determine a standard deviation for the estimated collection interval;
determine whether the standard deviation ($\sigma$) for the estimated collection interval of the data source is above a predetermined standard deviation threshold ($\sigma_{th}$); and
responsive to the standard deviation ($\sigma$) for the estimated collection interval of the data source being above the predetermined standard deviation threshold ($\sigma_{th}$), generate an error signal indicating an error in data collection with the data source.

14. The apparatus of claim 13, wherein the standard deviation ($\sigma$) for the estimated collection interval is determined utilizing the following formula:

$$\text{standard deviation } (\sigma) = \sqrt{[((x_1-\mu)^2 + (x_2-\mu)^2 + \ldots + (x_n-\mu)^2)/n]}$$

and wherein $x_1, x_2, \ldots, x_n$ are the set of collection intervals, wherein $\mu$ is the estimated collection interval, and wherein n is the number of collection intervals.

15. The apparatus of claim 14, wherein the estimated collection interval is determined utilizing the following formula:

$$\text{estimated collection interval } (\mu) = (x_1 + x_2 + \ldots + x_n)/n$$

and wherein $x_1, x_2, \ldots, x_n$ are the set of collection intervals and wherein n is the number of collection intervals.

16. The apparatus of claim 13, wherein a low standard deviation indicates that a last collection time tends to be very close to an average time between collections and wherein a high standard deviation indicates that the last collection time is spread out over a large range of the average time between collections.

17. The apparatus of claim 13, wherein the error in data collection with the data source is at least one of an error in the data source, an error in an agent serving the data source, an error in a data connection to the agent, or an error in a data connection between the agent and the data source.

* * * * *